Feb. 16, 1960
E. SCHIMMEL
2,925,556
ARRANGEMENT FOR MEASURING INCIDENT AND
REFLECTED POWER IN IMPULSE PEAKS
Filed Dec. 28, 1955
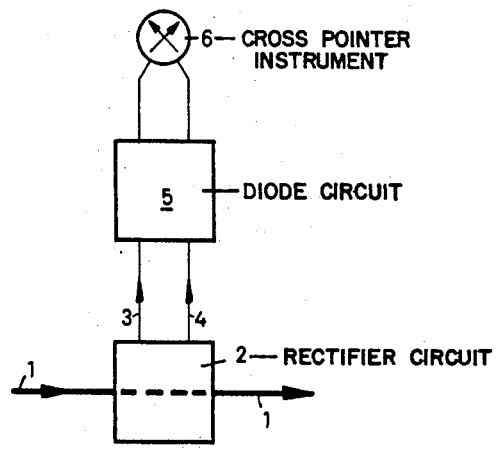
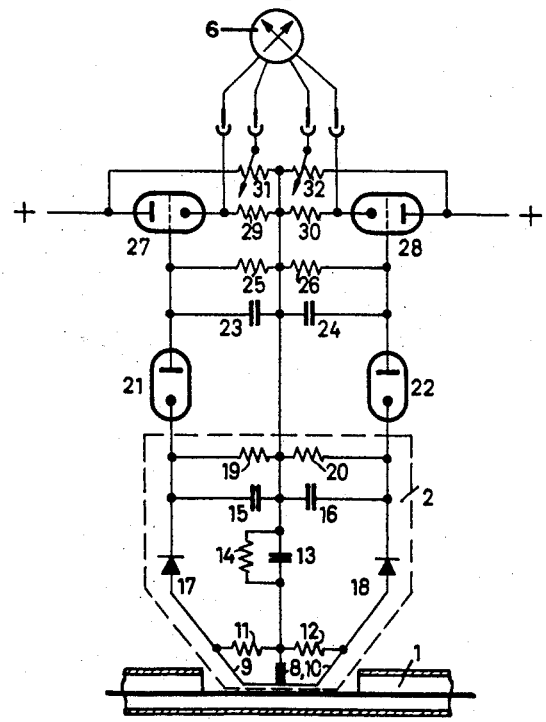
Inventor:
Erich Schimmel,
By
Atty.

United States Patent Office 2,925,556
Patented Feb. 16, 1960

2,925,556

ARRANGEMENT FOR MEASURING INCIDENT AND REFLECTED POWER IN IMPULSE PEAKS

Erich Schimmel, Munich-Grosshadern, Germany, assignor to Siemens & Halske Aktiengesellschaft, Munich and Berlin, Germany, a corporation of Germany Application December 28, 1955, Serial No. 556,003

1 Claim. (Cl. 324—95)

This invention is concerned with an arrangement for measuring the incident and reflected power occurring in impulse peaks.

In transmitters operating with negative amplitude modulation, there often arises the necessity to measure or to indicate continuously the incident and reflected power in the peaks of the synchronizing impulses. This is for example the case when it is in television transmitter equipment desired to measure and to indicate continuously the "synchronizing peak output," that is, the maximum output which occurs briefly incident to a synchronizing signal, which is usually specified as standard output.

The measuring of the "synchronizing peak output" with known methods of peak rectification in which the peak value of an impulse succession is indicated as a continuous value cannot be realized for the following reasons:

(1) If crystal diodes are used for the peak rectification, the value of the duty cycle cannot be obtained due to the finite blocking and pass impedance of the crystal diodes. In the case of television signals, for example, any random direct current value lying dependening on the picture content between the while level and the synchronizing level will be indicated.

(2) If tube diodes are used, there will be annoyingly noted, at high frequencies, the capacitance which is greater than that of crystal diodes; moreover, increased current is necessary and the tubes require larger space.

The invention avoids the above-indicated difficulties by subdividing the rectification into two stages. The impulse frequency band is obtained with the use of crystal diodes from the amplitude modulated high-frequency carrier voltage, and from the frequency band, by means of a tube diode circuit, is obtained a direct voltage which is proportional to the impulse power. In accordance with the invention, a crystal diode arrangement is used for separately obtaining, from the high-frequency carrier voltage which is amplitude modulated with impulses, the frequency band for the incident and reflected power and a tube diode circuit is used for obtaining from the frequency bands direct voltages which are respectively proportional to the incident and reflected power. The tube diode circuit comprises RC members which are quickly charged but discharge slowly.

In accordance with another feature of the invention, the direct voltages which are respectively proportional to the incident and reflected power are conducted over a direct current amplifier to a cross pointer instrument.

The above indicated and other objects and features of the invention will be brought out in the course of the description which is rendered below with reference to the accompanying drawing. In this drawing:

Fig. 1 is a schematic diagram illustrating the principle involved; and

Fig. 2 is a circuit diagram illustrating an embodiment of the invention and showing only the switching elements which are necessary for an understanding thereof.

Referring now to Fig. 1, numeral 1 indicates a line, usually a coaxial cable, for conducting the high-frequency energy from a transmitter stage to the antenna. Numeral 2 indicates the crystal diode arrangement. The impulse frequency band, that is, the television signal mixture, corresponding to the incident power is conducted to the tube diode arrangement 5 over conductor 4 and the impulse frequency band corresponding to the reflected power is conducted to the tube diode arrangement 5 over conductor 3. To the tube diode arrangement 5 is connected a cross pointer instrument 6.

In Fig. 2, the line 1 is shown as a coxial line provided with an opening in its outer shell through which a crystal diode arrangement 2 is placed relative to the inner conductor thereof. This crystal diode arrangement includes a common coupler comprising a metallic member 8 representing one layer of a coupling capacitance, two symmetrical coupling loops 9 and 10 containing load resistors 11 and 12, a capacitance 13 for the voltage division, a phase adjusting resistor 14, load capacitors 15 and 16, crystal diodes 17 and 18 and terminal resistors 19 and 20. The voltages occurring at the terminal resistors 19 and 20, representing respectively the impulse frequency band and television signal mixture for the incident and reflected power are rectified by tube diodes 21 and 22 cooperating with RC-members 23—25 and 24—26. The direct voltages produced at terminal resistors 25 and 26 of the RC-members, which are proportional respectively to the incident and reflected power occurring in the impulse peaks, are conducted to the cross pointer instrument 6 by way of direct current amplifiers comprising respectively amplifier tubes 27 and 28, cathode resistors 29 and 30, and compensation resistors 31 and 32 each provided with a tap and connected in parallel to the plates of the amplifier tubes. The compensation resistors 31 and 32 make it possible to compensate the starting currents (zero currents) of the tube diodes 21 and 22.

Changes may be made within the scope and spirit of the appended claim which define what is believed to be new and desired to have protected by Letters Patent.

I claim:

An arrangement for measuring the incident and reflected power occurring in peaks of impulses of an amplitude modulated carrier which includes other modulating signals, of a high frequency transmitter, comprising a symmetrically circuited control device, said device containing, in serially interconnected relationship, a common coupler having two symmetrical loops for conducting to said control device high frequency carrier voltage amplitude modulated by such impulses, a pair of crystal diodes, one connected with each of said loops, for separately obtaining from said carrier voltage the respective frequency bands for said incident and reflected power, a pair of diode tubes, one connected with each of said crystal diodes, for obtaining from said separate frequency bands direct voltages which are respectively proportional to said incident and reflected power, a pair of RC-members, one connected with each of said diode tubes, a pair of direct current amplifiers, one connected with each of said RC-members, and a cross pointer instrument connected with said direct current amplifiers for receiving therefrom for visual indication direct voltages which are respectively proportional to said incident and reflected power.

(References on following page)

References Cited in the file of this patent

UNITED STATES PATENTS

| | | | |
|---|---|---|---|
| 2,149,451 | Lent | Mar. 7, | 1939 |
| 2,423,390 | Korman | July 1, | 1947 |
| 2,442,606 | Korman | June 1, | 1948 |
| 2,442,614 | Norton | June 1, | 1948 |
| 2,588,390 | Jones | Mar. 11, | 1952 |
| 2,654,860 | Lewis | Oct. 6, | 1953 |
| 2,676,204 | Snijders | Apr. 20, | 1954 |
| 2,797,387 | Adams et al. | June 25, | 1957 |

OTHER REFERENCES

Proceedings of the I.R.E., February 1947, vol. 35, No. 2, "Directional Couplers," pages 160 to 165.

Electronics, October 1948, "Peak-to-Peak Voltmeter," pages 101–103.